April 27, 1965 H. N. OPPENHEIMER 3,180,932

EQUAL-AREA SIMULTANEOUS DISPLAY OF REMOTELY LOCATED TELEVISION CAMERAS' SIGNALS ON A SINGLE MONITOR SCREEN AND SYNCHRONIZATION OF SAME

Filed Feb. 19, 1963

INVENTOR.
HENRY N. OPPENHEIMER
BY H. A. Mackay
ATTORNEY

United States Patent Office
3,180,932
Patented Apr. 27, 1965

3,180,932

EQUAL-AREA SIMULTANEOUS DISPLAY OF REMOTELY LOCATED TELEVISION CAMERAS' SIGNALS ON A SINGLE MONITOR SCREEN AND SYNCHRONIZATION OF SAME

Henry N. Oppenheimer, New York, N.Y., assignor to General Precision, Inc., a corporation of Delaware
Filed Feb. 19, 1963, Ser. No. 259,599
6 Claims. (Cl. 178—6.8)

Figure 1:
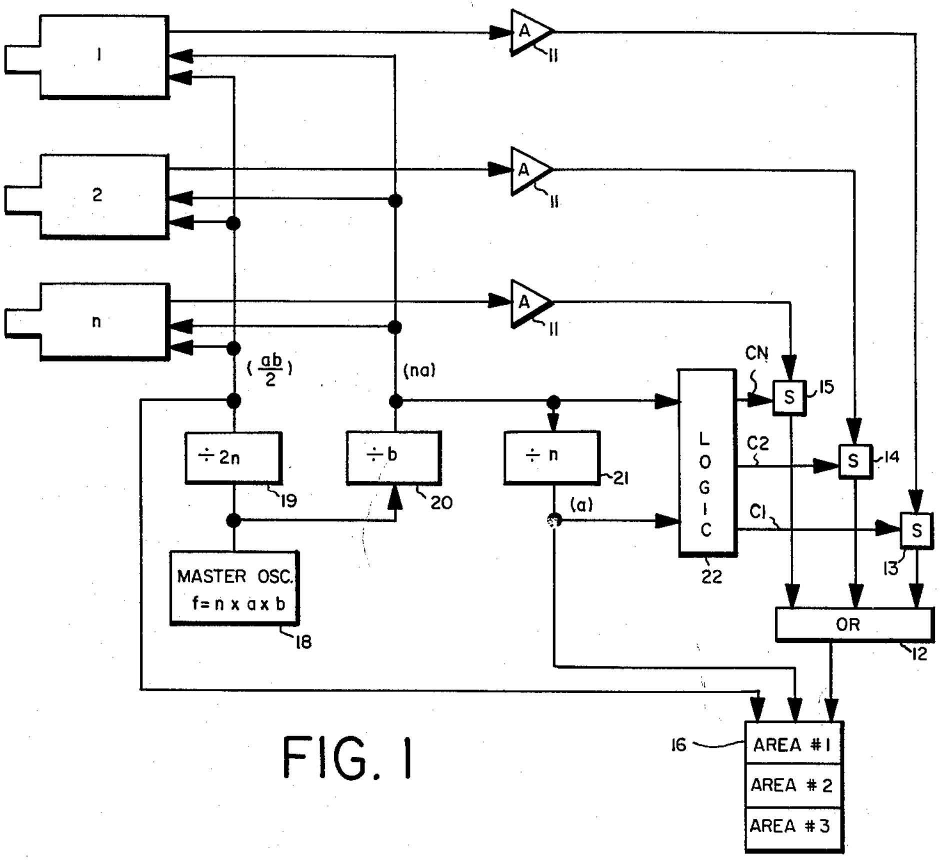

This invention relates to television distribution systems and more particularly to a system for simultaneously reproducing in discrete locations on a single receiver two or more complete images from two or more different television cameras.

Television, especially closed circuit television, is very useful in the fields of industrial process control and transportation as well as a large variety of other fields since it permits a remote viewer or controller to monitor widely separated objects or activities and take simultaneous action or make simultaneous decisions with respect thereto.

Such systems generally employ one or more cameras at each remote location and a monitor for each such camera. Where the number of cameras is excessive, switching may be employed to permit the viewer or controller to view any of the cameras on one or more monitors. However, multiple camera systems which employ time sharing are in some instances unsatisfactory since the controller is unable to view all of the activities simultaneously. In many instances the use of additional monitors will not solve the problem since the pictures are widely separated due to the physical size of the monitors. In addition to the space problem, each of these monitors contributes added cost which in many applications may prove prohibitive.

According to the invention the entire images from two, three or even four remotely located cameras may be simultaneously displayed on a single monitor thus eliminating as many as three monitors and their cost. In addition as many as four locations may be simultaneously viewed in the space ordinarily used to view a single location. With such an arrangement a controller can see more of the overall picture without moving his head and can thus monitor more locations.

One object of this invention is to provide a television viewing system in which complete images from two or more remotely located television cameras may be simultaneously reproduced in discrete locations on a single television receiver.

Another object of the invention is, to provide a television viewing system for reproducing simultaneously to complete images from a plurality of cameras, which may be manufactured at a substantially reduced cost.

A further object of this invention is to provide a television viewing system in which the space required for the viewing equipment is substantially reduced.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings and description are for illustration purposes only and are not to be construed as defining the limits of the invention.

Figure 2:
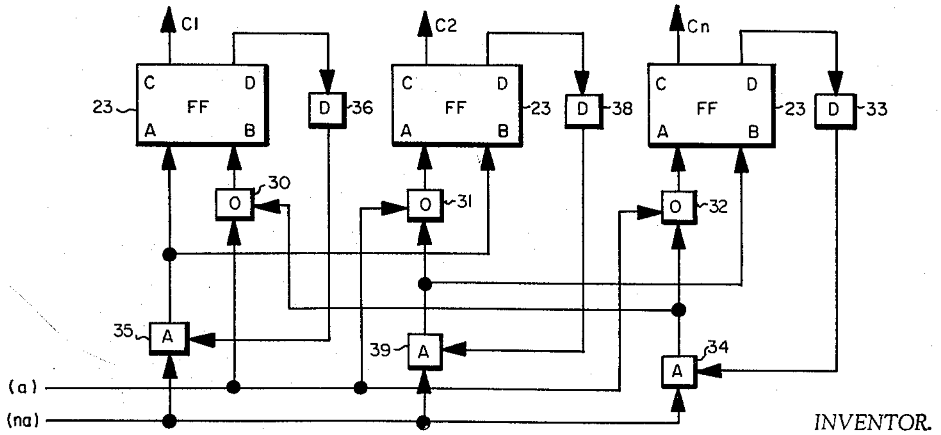

In the drawings:

FIGURE 1 is a block diagram of a novel television distribution and display system constructed according to the invention; and FIGURE 2 is a detailed block diagram of a portion of the circuit shown in FIGURE 1.

In FIGURE 1 a plurality of television cameras labeled 1 through $n$), inclusive, are each connected to identical video amplifiers 11. The amplifier for camera 1 is connected to an "or" circuit 12 by an electronic switch 13. The amplifiers 11 for cameras 2 through $n$ are connected to "or" circuit 12 by electronic switches 14 and 15, respectively.

The output of "or" circuit 12 is connected to a conventional receiver or monitor 16 which reproduces the video signals supplied by cameras 1 to $n$ through "or" circuit 12. The picture area of monitor 16 has been divided into "$n$" portions which are labeled to correspond to the camera labelings since the picture supplied by that camera will be reproduced in that area.

A master oscillator 18 provides a single frequency output which equals $(n \times a \times b)$ where "n" is the number of images which are to be simultaneously reproduced on monitor 16, "$a$" is the field frequency which is to be employed in monitor 16, which in most instances will be 60 c.p.s., and "$b$" is the number of horizontal lines per frame which will be reproduced in each image on monitor 16. In a conventional system 525 lines per frame are employed; thus, the horizontal sweep frequency which equals $(ab/2)$ will yield a horizontal sweep frequency of 15,750 c.p.s.

Horizontal and vertical sync pulses for the cameras and the monitor are derived from the master oscillator output by a series of countdown circuits which frequency divide the output in order to obtain sync pulses at the appropriate frequencies.

A first countdown circuit 19 frequency divides the output of oscillator 18 by $(2n)$ to provide horizontal sync pulses for both the camera and the monitor at a frequency $(ab/2)$ which in a system employing conventional frequencies will have the aforesaid numeric value equal to 15,750 c.p.s.

A second countdown circuit 20 frequency divides the output of oscillator 18 by $(b)$ to provide vertical sync pulses for the cameras only at a frequency $(na)$ which in a system employing conventional frequencies will have a numeric value of 180 c.p.s. The output of countdown circuit 20 is applied to a third countdown circuit 21 which frequency divides $(na)$ by $n$ to provide vertical sync pulses for monitor 16 only at a frequency $(a)$ which in a conventional system of any number of images will have a numeric value of 60 c.p.s.

The output of countdown circuit 20 at frequency $(na)$ and that of countdown circuit 21 at frequency $(n)$ are also applied to a logic circuit 22, the details of which are shown in FIGURE 2. Logic circuit 22 periodically provides voltages on conductors $c1$ through $cn$ which are connected to switches 13 through 15, respectively, for operating the switches to cyclically apply the outputs of cameras 1 through $n$ to monitor 16 once each cycle of output frequency $(a)$ from countdown circuit 21.

In a system employing conventional frequencies and three cameras, monitor 16 is operated at a 60 field per second rate while each of the three cameras is operated at 180 fields per second. This results in 6:1 interlace in the pictures generated by the cameras; however, when the three images are reproduced by the monitor, four out of every six fields from each camera are not reproduced. Thus each of the three images reproduced on the monitor has a 2:1 interlace and line crawl is not a problem.

Of any six consecutive fields produced by each camera, the first and fourth fields of the first camera are the only fields reproduced on the monitor while only the second and fifth, and the third and sixth of the second and third cameras, respectively, are reproduced. How this is accomplished will become apparent from a consideration of the circuit disclosed in FIGURE 2 which is a detailed block diagram of logic circuit 22 which controls switches 13, 14 and 15.

Logic circuit 22 is a conventional "$n$" stage ring counter with a forced reset and employs "$n$" similar flip-flops 23. Here again "$n$" equals the number of cameras which are to be simultaneously reproduced on monitor 16. The pulse at "$a$" frequency coincides with the beginning of each field on the monitor 16. This pulse forces a reset which energizes conductor $c1$ to cause switch 13 to connect the output of camera #1 to the monitor input. With each succeeding pulse at frequency "$na$" the ring counter steps and in sequence conductors $c2$ and $cn$ are energized to operate switches 14 and 15, respectively. The cycle continues to repeat as long as operation is desired. If, however, an "$na$" pulse is dropped, the cycle is automatically reset with the next "$a$" pulse. This feature is essential if the images from the cameras are to remain in their designated areas. Without this feature the loss of a single pulse at frequency "$na$" would cause the images to shift one position permanently. The images will actually shift if an "$na$" pulse is lost, with the arrangement disclosed, but they will be restored to their proper position on the occurrence of the next "$a$" pulse.

Logic circuit 22 is reset by every "$a$" pulse since the "$a$" pulse is applied to input "B" of the first stage through an "or" circuit 30 while it is simultaneously applied to the "A" inputs of each succeeding stage through "or" circuits 31 and 32. If none of the preceding "$na$" pulses had been lost since the previous "$a$" pulse, the "D" output of the last stage through a delay circuit 33 would enable "and" gate 34 and the occurrence of the first "$na$" pulse in the series would be applied to the "A" input of the last stage through "and" gate 34 and "or" gate 32 to turn the last stage off.

Simultaneously the output of "and" gate 34 is applied to the "B" input of the first stage through "or" circuit 30 to turn the first stage on. The next "$na$" pulse passes through an "and" gate 35 which is enabled by the "D" output of the first flip-flop through a delay circuit 36 to the "A" input of the first flip-flop and turns it off. Simultaneously the output of "and" gate 35 is applied to the "B" input of the second stage to turn it on. Another delay circuit 38 connected to the "D" output of the second flip-flop enables an "and" circuit 39 which has its output connected to the "A" input of the second flip-flop through "or" gate 31, and to the "B" input of the $n$th or the 3rd stage in the circuit illustrated. Thus, on the occurrence of the third, or last, "$na$" pulse, the second flip-flop is turned off and the third flip-flop turned on. The circuit is now in the condition previously described and will continue to recycle as described. If, however, one or more "$na$" pulses are lost, the next "$a$" pulse will reset all the flip-flops, as previously described, to synchronize the cycle and force the reproduction of the images in the correct locations.

While one embodiment only of the invention has been shown and described for illustration purposes, it is to be expressly understood that the invention is not limited thereto. Various changes may also be made in both the design and arrangement of the parts without departing from the spirit and scope of the invention as the same will now be understood by those skilled in the art.

What is claimed is:

1. A multiple image television distribution system comprising,
   a plurality of cameras for generating television signals,
   a television image reproducer,
   means for generating a first frequency, for controlling the field rate of the television image reproducer, and a second frequency, which is equal to said first frequency multiplied by the number of images which are to be simultaneously reproduced, for controlling the field rate of the television cameras.
   and means responsive to both said first and second frequencies for sequentially applying the camera video outputs to the television image reproducer whereby the images from each camera are simultaneously displayed in preselected locations.

2. A television distribution system as set forth in claim 1 in which the means for generating the said first and second frequencies comprises,
   a master oscillator for supplying an output having a frequency equal to the product of ($n$), ($a$) and ($b$), where ($n$) equals the number of images which are to be simultaneously reproduced, ($a$) equals the field frequency of the image reproducer, and ($b$) is the number of horizontal lines per frame in each image,
   first means responsive to the oscillator output for dividing the output frequency by ($b$) to provide the aforementioned second frequency,
   and second means responsive to the first means output for dividing the output frequency by ($n$) to provide the aforementioned first frequency.

3. A multiple image television distribution system comprising,
   a plurality of cameras for generating television signals,
   a television image reproducer,
   means for generating a first frequency equal to ($ab/2$) where ($a$) is the desired field frequency of the reproducer and ($b$) is the desired number of lines per frame of each image, a second frequency equal to ($na$) where ($n$) is the number of images to be simultaneously reproduced, and a third frequency equal to ($a$),
   means for connecting the first frequency to the horizontal deflection circuits of the cameras and the reproducer for synchronizing their horizontal deflection circuits,
   means for connecting the second frequency to the vertical deflection circuits of the cameras for synchronizing the vertical deflection circuits of each camera,
   means for connecting the third frequency output to the vertical deflection circuit of the reproducer for synchronizing the circuit,
   and means responsive to both the said second and third frequencies for sequentially applying the camera outputs to the reproducer for equal lengths of time once during each cycle of the third frequency output.

4. A television distribution system as set forth in claim 3 in which the means for generating the said first, second and third frequencies comprises,
   a master oscillator for supplying an output having a frequency equal to the product ($n \times a \times b$), where ($n$) is the number of images to be simultaneously reproduced, ($a$) is the desired field frequency of the image reproducer, and ($b$) is the desired lines per frame in each image,
   first means responsive to the oscillator output for frequency dividing the output by ($2n$) to obtain ($ab/2$),
   second means responsive to the oscillator output for frequency dividing the output by ($b$) to obtain ($na$),
   and third means responsive to the second means output for frequency dividing the output by ($n$) to obtain ($a$).

5. A multiple image television distribution system comprising,
   a plurality of cameras for generating television signals,
   a television image reproducer,
   means for generating a first signal frequency at the field rate of the television image reproducer,
   means for generating a second signal frequency equal to said first signal frequency multiplied by the number of cameras whose images are to be reproduced,
   logic circuit means having first and second inputs and a plurality of outputs equal in number to the number of cameras whose images are to be reproduced, each of said outputs being connected to a respective switch means interposed between a respective camera output and the input of said television reproducer, means imposing said second signal frequency on the first input of said logic circuit means causing said logic circuit means to generate output signals on its plurality of outputs in sequential relation in a repetitive cycle, and means imposing said first signal frequency on the second input of said logic circuit means resetting the cycle of operation of said logic circuit means at the rate of said first signal frequency to insure the same sequential operation in each repetitive cycle.

6. A multiple image television distribution system comprising, a plurality of cameras for generating television signals, a television image reproducer, means for generating a first signal frequency equal to $(ab/2)$ where $(a)$ is the desired field frequency of the reproducer and $(b)$ is the desired number of lines per frame of each image, a second signal frequency equal to $(na)$ where $(n)$ is the number of cameras, and a third signal frequency equal to $(a)$, means for connecting the first signal frequency to the horizontal deflection circuits of the cameras and the reproducer for synchronizing their horizontal deflection circuits, means for connecting the second signal frequency to the vertical deflection circuits of the cameras for synchronizing the vertical deflection circuits of each camera, means for connecting the third signal frequency to the vertical deflection circuit of the reproducer for synchronizing the vertical deflection circuit of the reproducer, logic circuit means having first and second inputs and a plurality of outputs equal in number to the number of cameras whose images are to be reproduced, each of said outputs being connected to a respective switch means interposed between a respective camera output and the input of said reproducer, means imposing said second signal frequency output on the first input of said logic circuit means causing said logic circuit means to generate output signals on its plurality of outputs in sequential relation in a repetitive cycle, and means imposing said third signal frequency on the second input of said logic circuit means resetting the cycle of operation of said logic circuit means at the rate of said third signal frequency to insure the same sequential operation in each repetitive cycle.

References Cited by the Examiner

UNITED STATES PATENTS

| | | | |
|---|---|---|---|
| 2,191,565 | 2/40 | Henroteau | 179—15 |
| 2,277,516 | 3/42 | Henroteau | 179—15 |
| 2,367,277 | 1/45 | Henroteau | 179—15 |
| 2,677,720 | 5/54 | Bedford | 179—15 |

DAVID G. REDINBAUGH, *Primary Examiner.*